United States Patent
Logan et al.

(10) Patent No.: US 7,216,429 B2
(45) Date of Patent: May 15, 2007

(54) METHODS FOR REPLACEMENT OF A SLOTTED TAIL ROTOR BLADE PITCH HORN

(75) Inventors: James E. Logan, Oxford, CT (US); Paul Alesevich, Stratford, CT (US); Mark S. Liska, Seymour, CT (US); Sebastian DiMauro, Middleton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 153 days.

(21) Appl. No.: 10/937,007

(22) Filed: Sep. 9, 2004

(65) Prior Publication Data
US 2005/0141995 A1 Jun. 30, 2005

Related U.S. Application Data

(60) Provisional application No. 60/532,353, filed on Dec. 24, 2003.

(51) Int. Cl.
*P23B 6/00* (2006.01)
*B64C 27/08* (2006.01)
(52) U.S. Cl. .................. 29/889.1; 29/897.2; 29/401.1; 29/402.08; 244/17.27; 244/17.23

(58) Field of Classification Search ............... 29/401.1, 29/889.1, 897.2; 416/147; 244/17.27, 17.23
See application file for complete search history.

(56) References Cited

OTHER PUBLICATIONS

Airworthiness Directives; Bell Helicopter Textron Canada Model 222, 222B, 222U, and 230 Helicopters vol. 67 Issue: 151 p. 50793 Citation No. 67 FR 50793 Date: Tuesday, Aug. 6, 2002. Agency: DOT; FAA CFR: 14 CFR Part 39.*

* cited by examiner

*Primary Examiner*—David P. Bryant
*Assistant Examiner*—Sarang Afzali
(74) *Attorney, Agent, or Firm*—Carlson, Gaskey & Olds

(57) ABSTRACT

A tail rotor assembly includes a slotted pitch horn which replaces a production non-replaceable pitch horn. A slot is cut along a leading edge of each pitch control horn and a chordwise cut is made through the upper and lower blade surface skins. The production pitch control horn is removed from the tail rotor assembly by passing the spar through the slot. The slotted pitch horn is assembled over the spar and a collar is located adjacent thereto. The collar is bonded to the slotted pitch horn and the upper and lower blade surface skins at predetermined bond areas. An inner horn plate and an outer horn plate are bonded over the horn slot and a trailing edge doubler is bonded to the blade trailing edge to finish the trailing edge horn area and close the upper and lower skin surfaces.

13 Claims, 24 Drawing Sheets

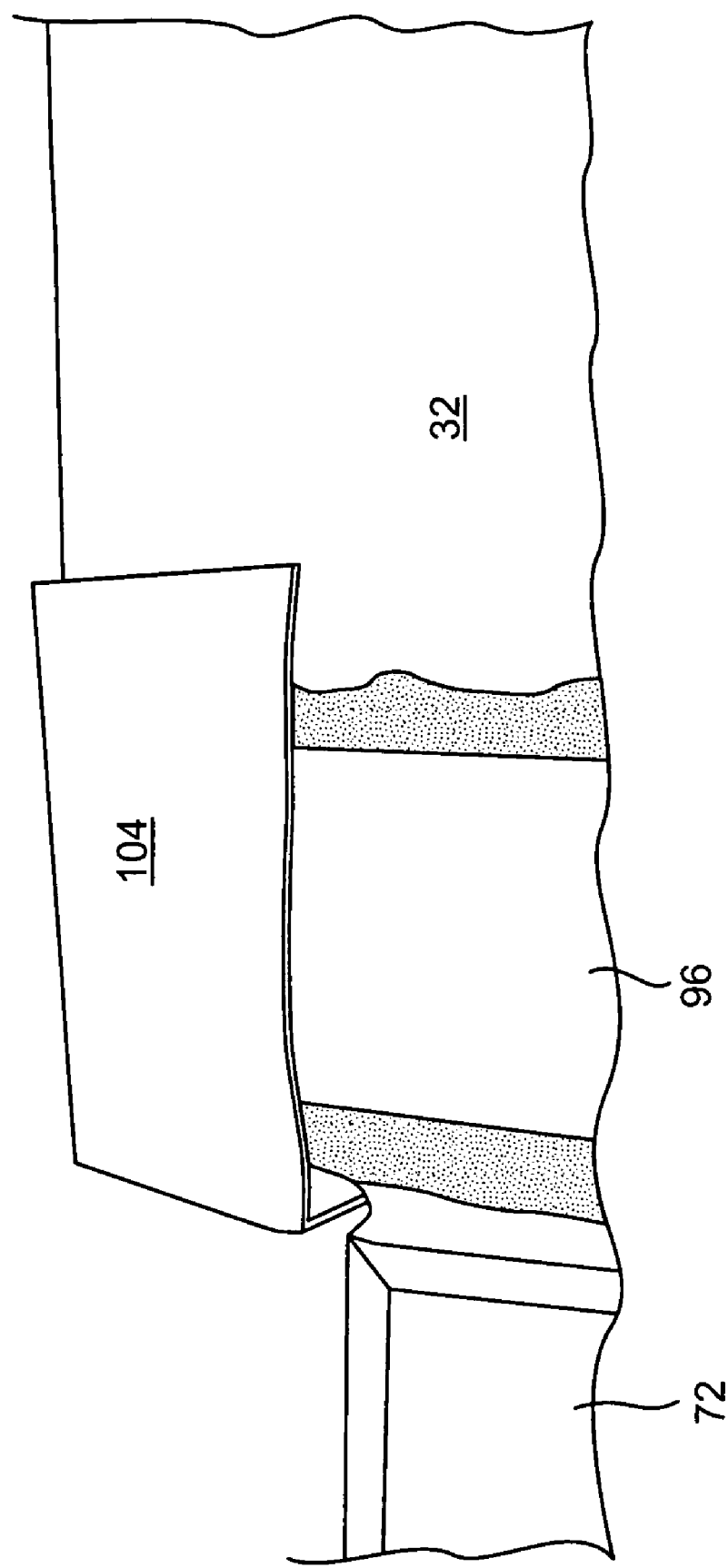

METHODS FOR REPLACEMENT OF A SLOTTED TAIL ROTOR BLADE PITCH HORN

The present invention claims the benefit of U.S. Provisional Patent Application No. 60/532,353, filed Dec. 24, 2003.

BACKGROUND OF THE INVENTION

The present invention relates to a tail rotor system, and more particularly to the replacement of a tail rotor pitch horn which minimizes disturbance of the preexisting tail rotor blade structure.

Conventional tail rotor systems are provided in a variety of different specific constructions. A cross-beam tail rotor blade system accommodates blade flap and pitch change motion by deflection of a flexible graphite fiber spar. The spar is a continuous member running from a tip of one tail rotor blade to a tip of the opposite tail rotor blade. Pitch control horns mounted to the inboard section of each tail rotor blade are driven by actuators to deflect the tail rotor blades and flex the spar to provide a desired anti-torque action in response to pilot inputs. The pitch control horns are manufactured as one-piece cuffs which receive the spar therethrough and attach to the blade skins which are mounted thereafter.

During assembly of such tail rotor systems, the pitch control horns are slid longitudinally over the spar toward the center thereof prior to bonding of the core and blade skins to longitudinal outboard section of the spar. After mounting of the core and blade skins to the spar, the pitch control horns are bonded into the inboard section of the blade skins to communicate the pitch force from an actuator to the tail rotor blades and to seal the inboard open end of the blade skins. A strong, effective and lightweight tail rotor system is thereby provided which minimizes the necessity of lubrication and bearings.

Disadvantageously, due to the above described manufacturing method, when damage/corrosion beyond predetermined limits occurs to one pitch control horn, the entire tail rotor system must be replaced. Replacement of the entire tail rotor system is relatively expensive.

Accordingly, it is desirable to provide a repair method to replace the pitch control horns while minimizing disturbance of the preexisting tail rotor blade structure.

SUMMARY OF THE INVENTION

The tail rotor assembly according to the present invention includes a slotted pitch horn which replaces a production non-replaceable pitch horn. The slotted pitch horn defines a horn slot sized to receive the spar therethrough.

To install the slotted pitch horn, the tail rotor assembly is first disassembled such that non-bonded components are removed from the bonded components. Once the non-bonded components are disassembled from the tail rotor assembly, each pitch control horn is removed by mounting the tail rotor assembly within a horn cut-off fixture. A slot is cut along a leading edge of each pitch control horn at a width which is at least wide enough to permit the spar to pass therethrough. A chordwise cut locating fixture is mounted about the blade assembly and a chordwise cut is made through the upper and lower blade surface skins. The pitch control horn is removed from the tail rotor assembly by sliding the horn over the spar through the cut leading edge slot.

The tail rotor assembly is mounted in a blade bonding fixture to retain the tail rotor assembly in a spanwise direction, a chordwise direction and a pitch direction to assure orientation of the pitch control horn to the rotor blade assembly. The replacement slotted pitch horn is assembled over the spar and a collar is located adjacent thereto to span a portion of the slotted pitch horn and a portion of the upper and lower blade surface skins. The collar is bonded to the slotted pitch horn and the upper and lower blade surface skins at predetermined bond areas. An inner horn plate and an outer horn plate are bonded over the horn slot. A trailing edge doubler is bonded to the blade trailing edge to finish the trailing edge horn area and close the upper and lower skin surfaces at the blade trailing edge.

The bonds are inspected and the non-bonded components are then reassembled to the tail rotor assembly. Finally, each repaired tail rotor assembly is identified to provide for later tracking and inspection, however, Applicant has determined that the tail rotor replacement method provides fatigue strength demonstrated to be equivalent to the production non-replaceable tail rotor horn.

The present invention therefore provides a repair method to replace the pitch control horns while minimizing disturbance of the preexisting tail rotor blade structure.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 24 is a top perspective view looking toward the trailing edge of the blade assembly illustrating the mounting location for the trailer edge doubler.

DETAILED DESCRIPTION OF THE PREFERRED EMBODIMENT

Figure 1:
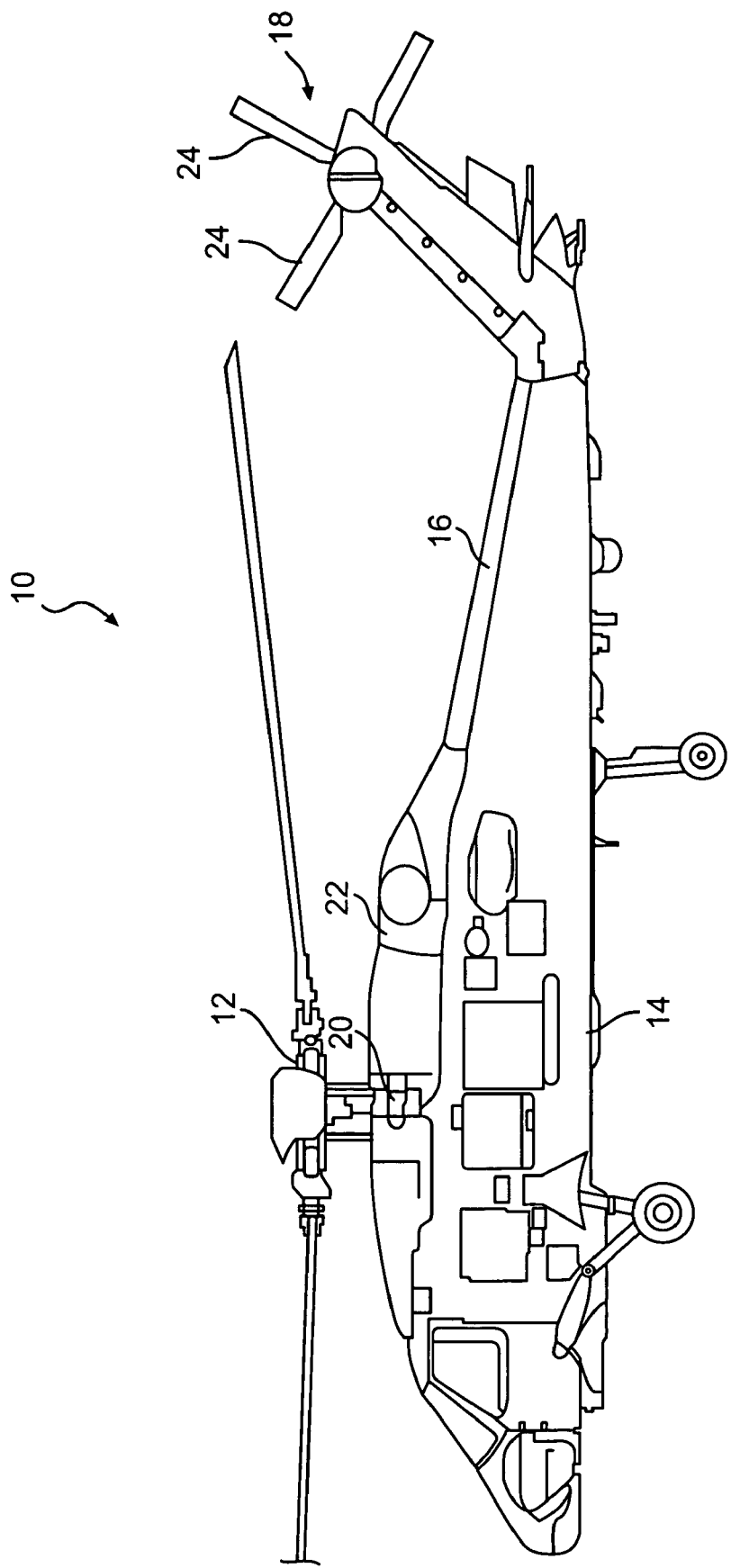
FIG. 1 is a general perspective view an exemplary rotary wing aircraft embodiment for use with the present invention.

FIG. 1 schematically illustrates a rotary-wing aircraft 10 having a main rotor assembly 12. The aircraft 10 includes an airframe 14 having an extending tail 16 which mounts an anti-torque tail rotor system 18. The main rotor assembly 12 is driven through a transmission (illustrated schematically at 20) by one or more engines 22. Although a particular helicopter configuration is illustrated in the disclosed embodiment, other machines such as turbo-props, tilt-rotor and tilt-wing aircraft will also benefit from the present invention.

Figure 2:
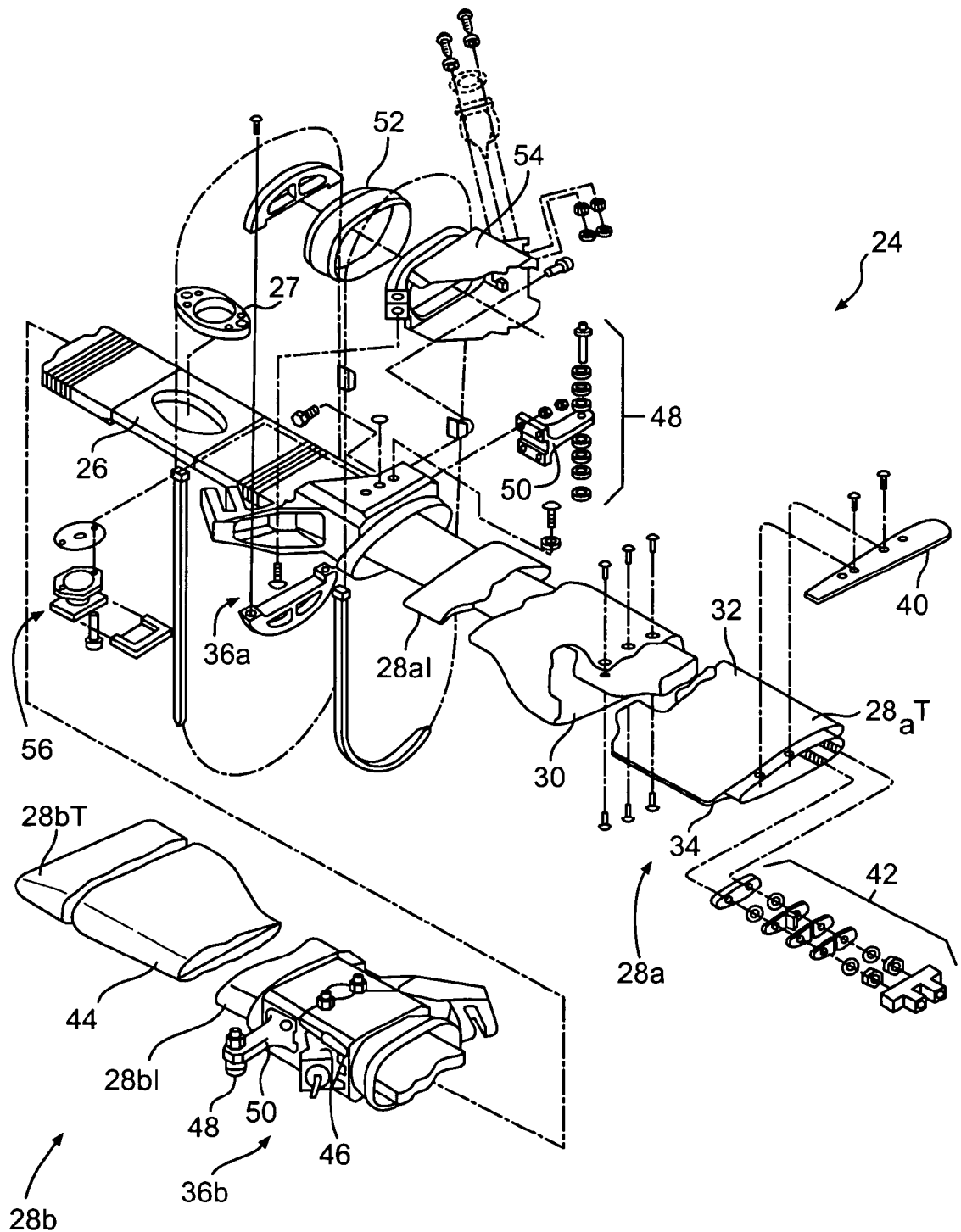
FIG. 2 is an exploded view of a tail rotor assembly.

Referring to FIG. 2, one tail rotor assembly 24 of the tail rotor system 18 is illustrated. The tail rotor assembly 24 is preferably a cross-beam tail rotor system which includes a spar 26 that accommodates blade flap and pitch change motion by deflection. Typically, two tail rotor assemblies 24 will be mounted transverse each other upon a single axle (FIG. 1) through a central mount aperture 27 located through the spar 26 of each tail rotor assembly 29. The spar 26 is a continuous member running through a first tail rotor blade assembly 28a and a second tail rotor blade assembly 28b. The spar 26 runs from a tip segment 28aT, 28bT of each tail rotor blade assembly 28a, 28b. Each tail rotor blade assembly 28a, 28b typically includes a core 30 with an upper and lower blade surface skin 32, 34 which forms the blade surface about the spar 26. A pitch control horn 36a, 36b is mounted to the inboard segment 28aI, 28bI of each tail rotor blade assembly 28a, 28b.

It should be understood that although a particular tail rotor component arrangement is disclosed in the illustrated embodiment, other arrangements will benefit from the instant invention.

Tail Rotor Blade Component Disassembly

Figure 3:
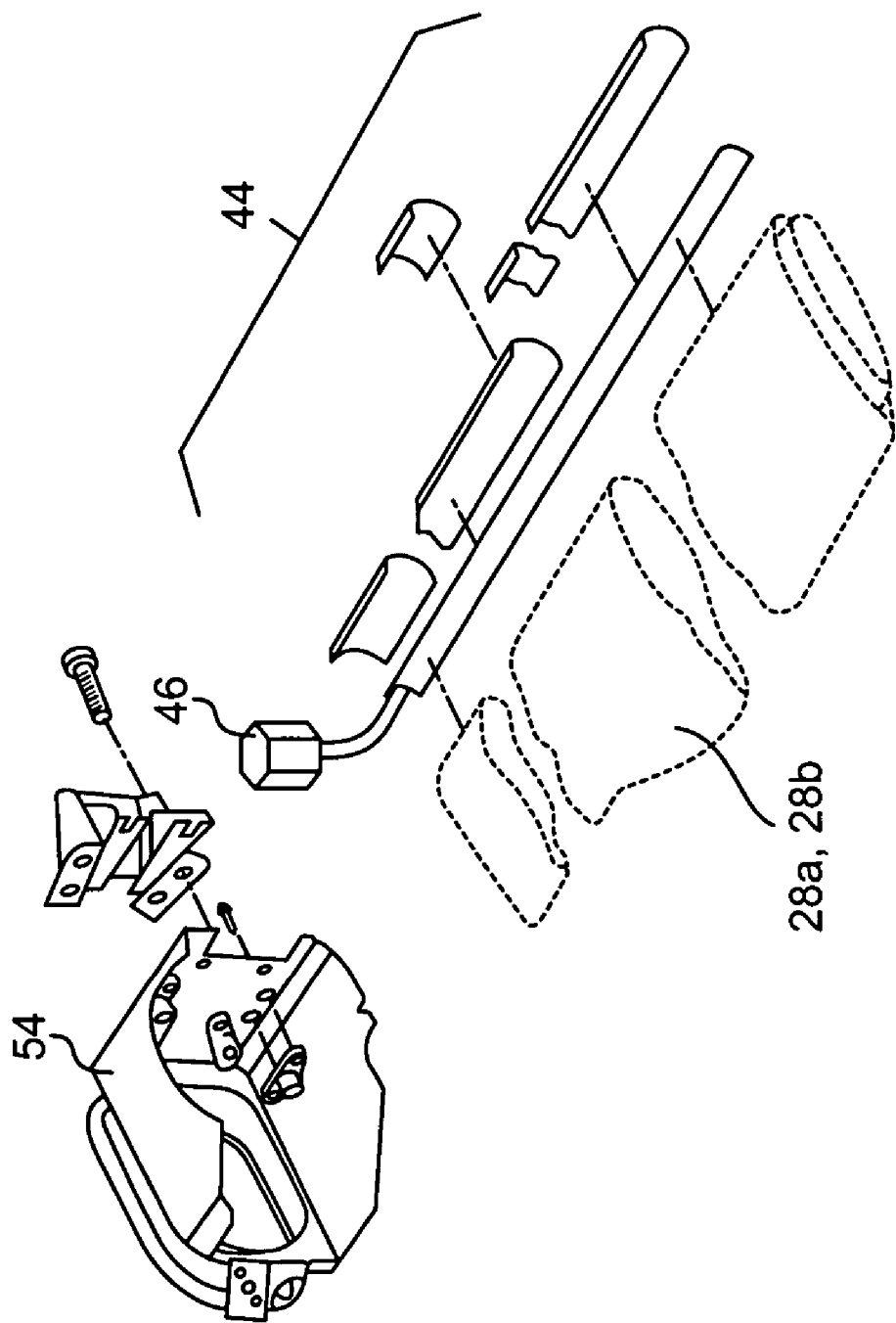
FIG. 3 is an exploded view of nonbonded leading edge components the tail rotor assembly of FIG. 2.
Figure 4:
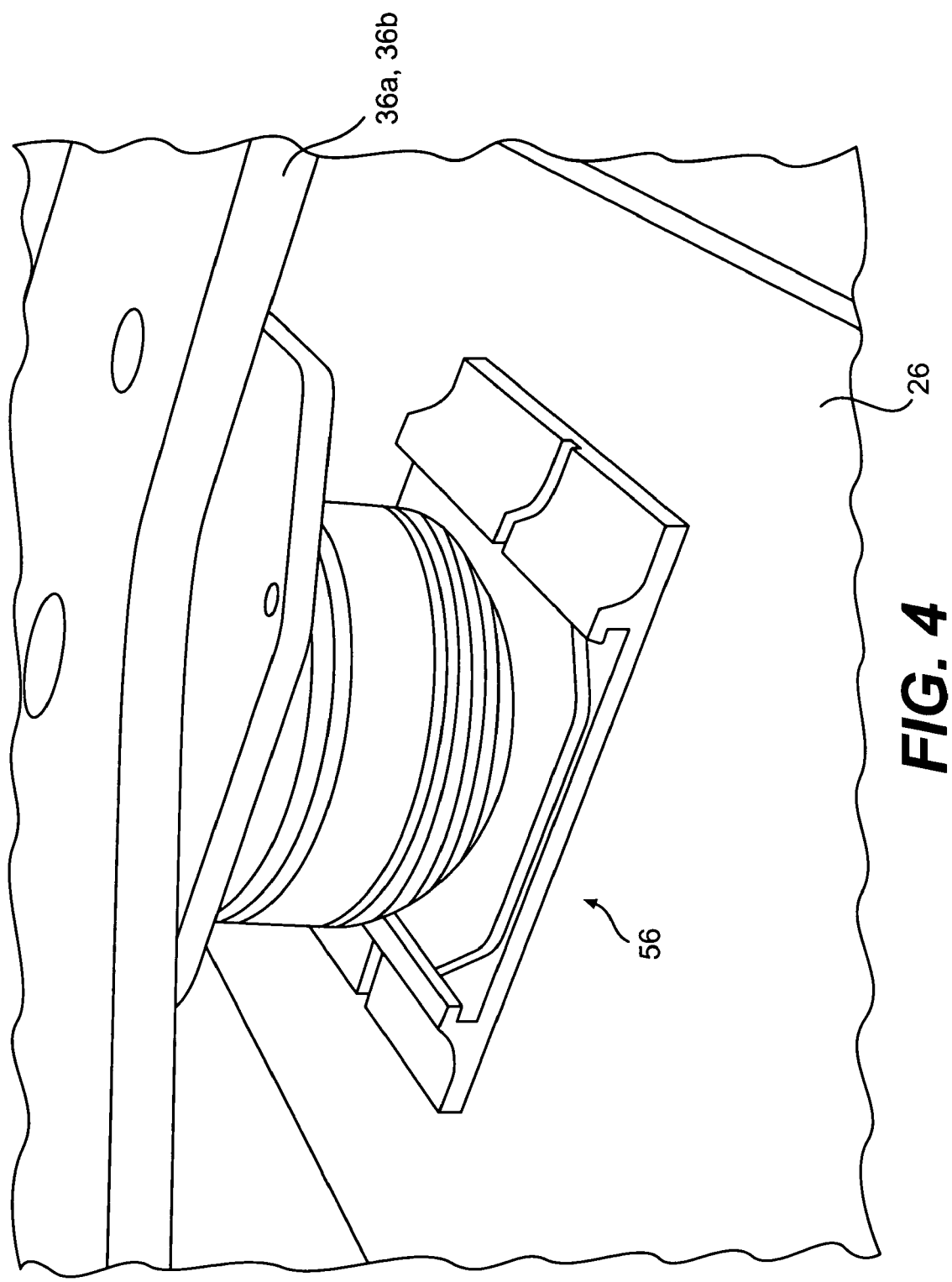
FIG. 4 is an expanded perspective view of a snubber bearing assembly between a pitch control horn and a blade spar of the tail rotor assembly of FIG. 3.

The tail rotor assembly 24 is first disassembled such that the non-bonded components are removed from the bonded components, e.g. the spar 26, the tail rotor blade assembly 28a, 28b and the pitch control horns 36a, 36b. Removal of the non-bonded components include removal of a tip cap assembly 40, a counterweight assembly 42, a leading edge heater mat assembly 44, a de-ice harness plug assembly 46 (also illustrated in FIG. 3), a chordwise balance weight 48, a balance bracket, 50, a boot 52, a fairing 54 and a snubber bearing 56 (also illustrated in FIG. 4) from each blade assembly 28a, 28b. It should be understood that other components which can readily be removed from the tail rotor assembly 24 will also be initially removed. Other blade assemblies may or may not include each of the noted components but will likewise benefit from the present invention.

Figure 5:
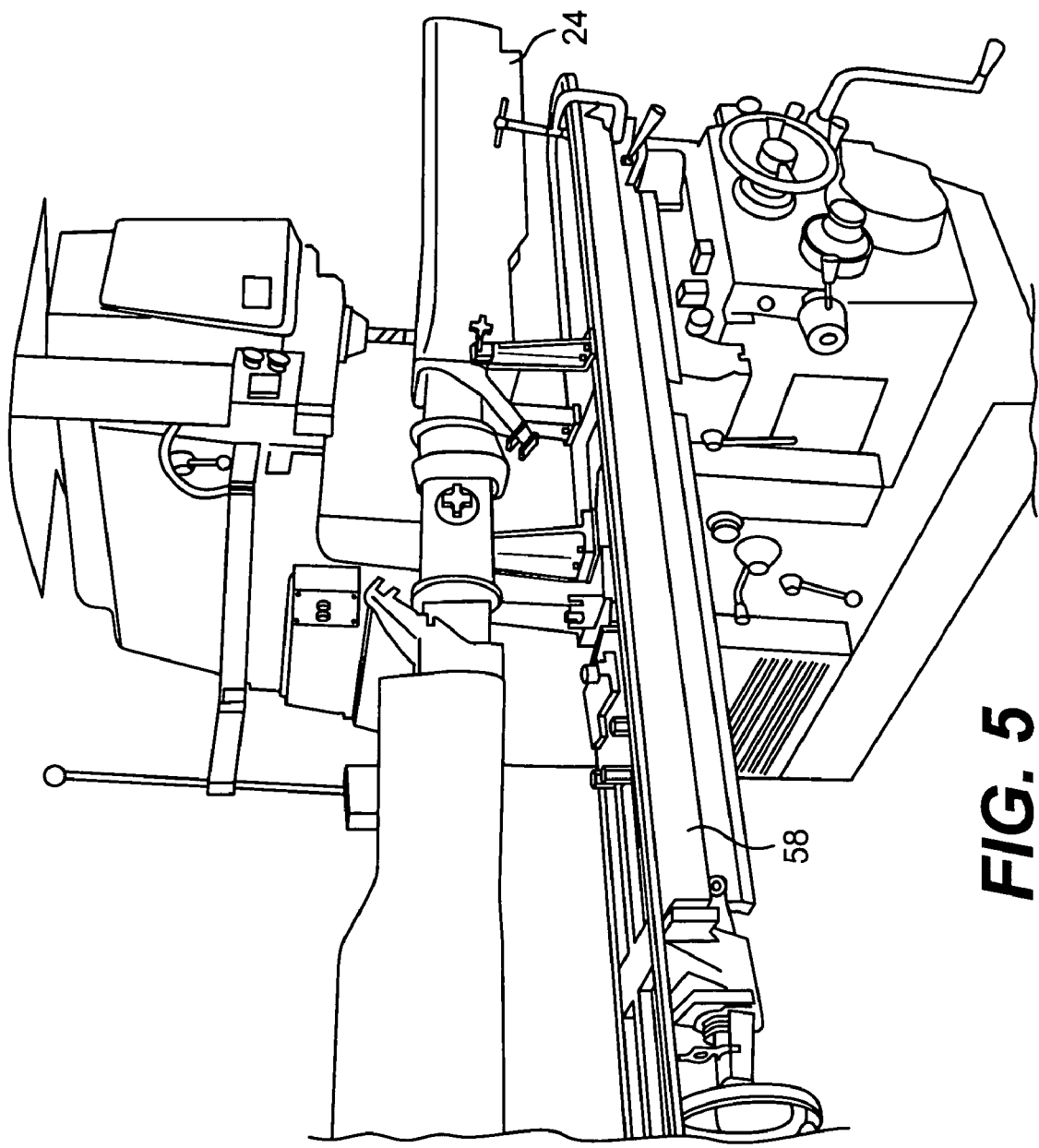
FIG. 5 is a perspective view of a tail rotor assembly mounted within a horn cutoff fixture.

Referring to FIG. 5, once the non-bonded components are disassembled from the rail rotor assembly, each pitch control horn 36a, 36b is removed. Although replacement of the single pitch control horn 36a will be described, it will be appreciated that replacement of the opposite pitch control horn 36b will proceed in the same manner.

Pitch Control Horn Removal

Figure 6:
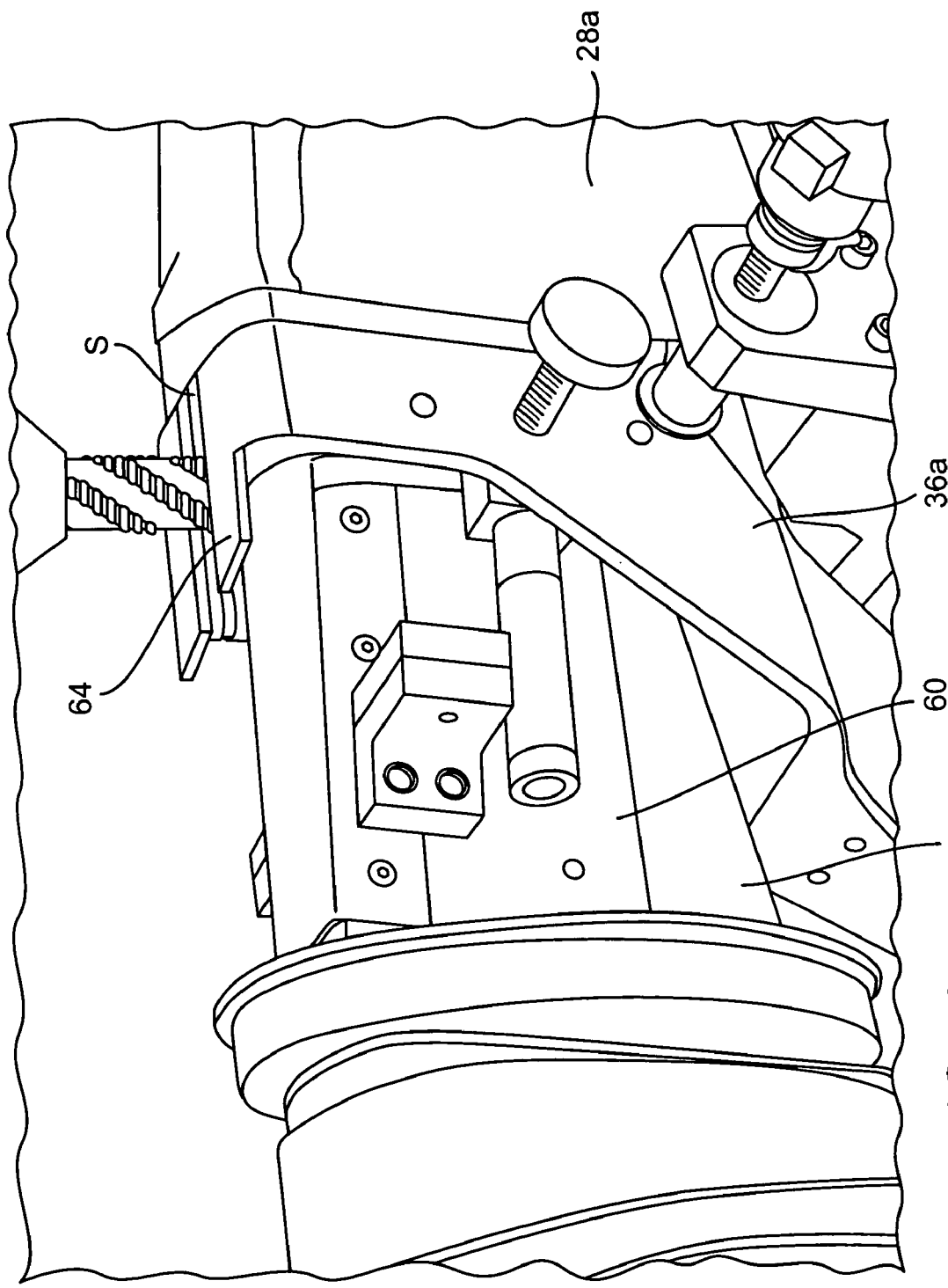
FIG. 6 is an expanded top perspective view of a pitch control horn mounted in the horn cut off fixture of FIG. 5 during milling of a slot cut into the leading edge of a pitch control horn.

The tail rotor assembly 24 is mounted within a horn cut-off fixture 58 and a spar protector 60 is mounted over a spar leading edge 62 (FIG. 6). The spar protector 60 is located over the spar 26 and below the pitch control horns 36a, 36b for a longitudinal length which prevents inadvertent damage to the spar 26.

Figure 7:
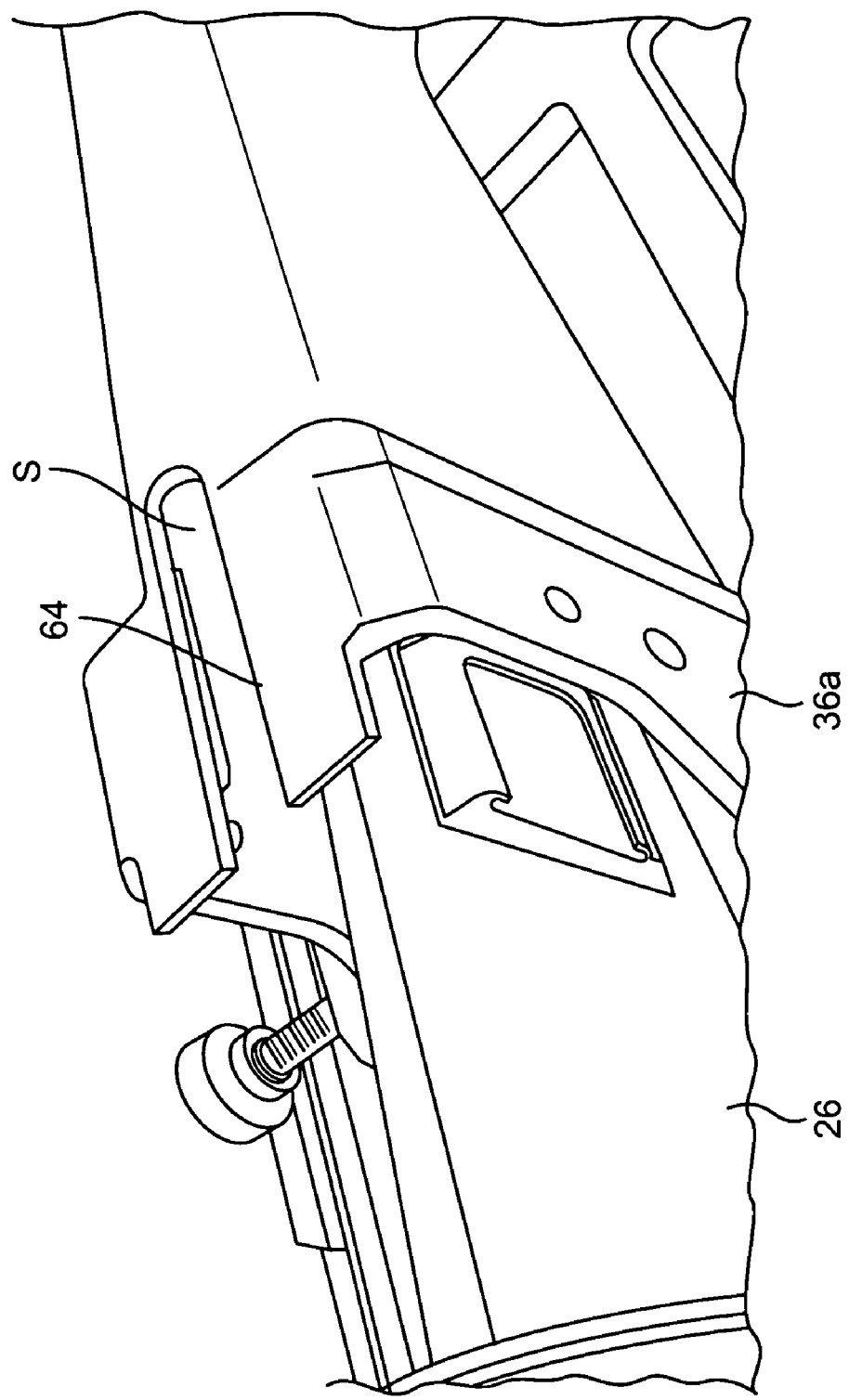
FIG. 7 is a generally top perspective view of a slot cut into the leading edge of a pitch control horn.

Preferably, a milling machine or the like is utilized to cut a slot S along a leading edge 64 of each as manufactured pitch control horn 36a, 36b. The slot S is milled through the leading edge 64 and along the longitudinal length of the pitch control horn 36a (FIG. 7). The slot S is preferably of a width which is at least wide enough to permit the spar 26 to pass there through.

Figure 8:
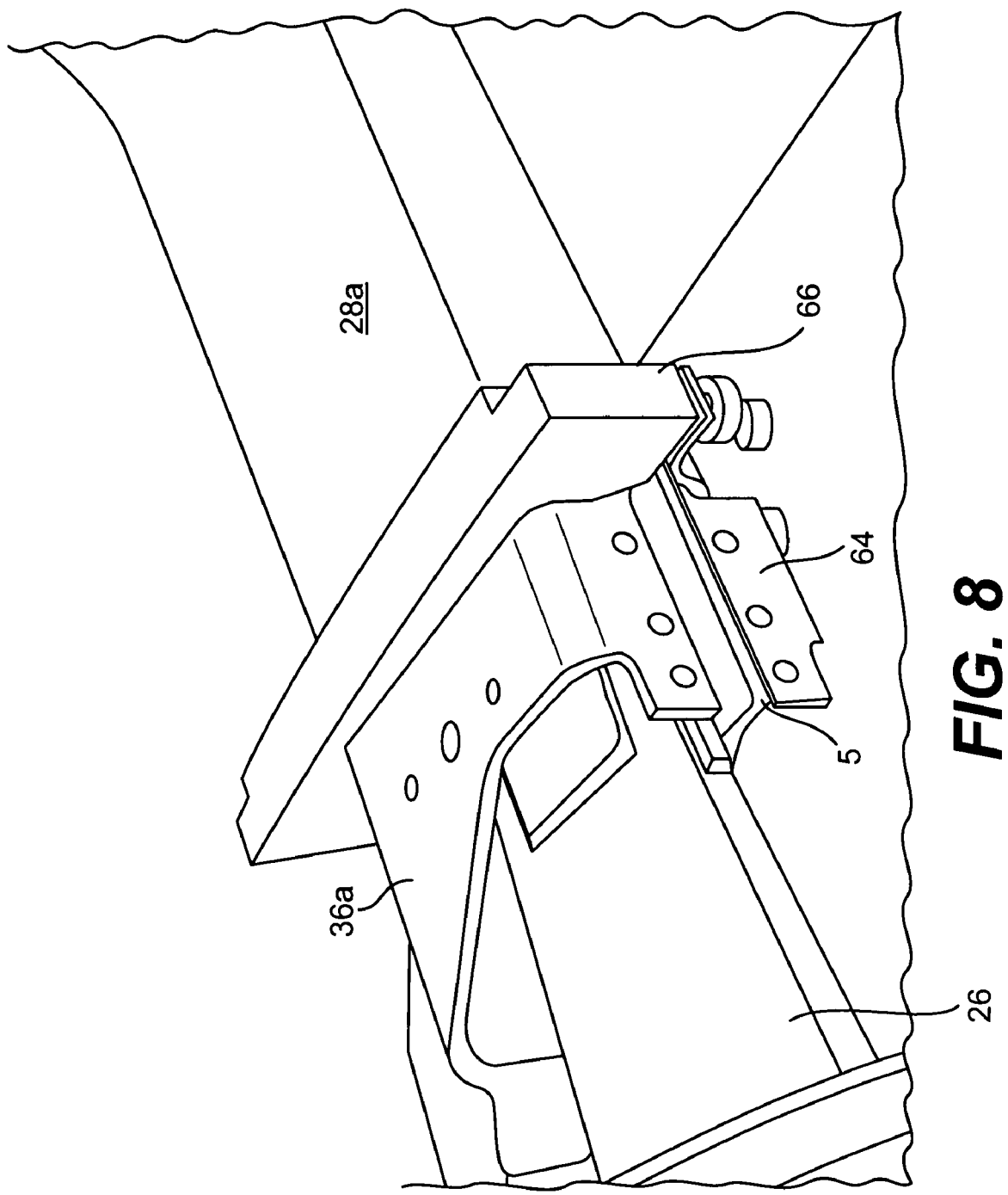
FIG. 8 is an expanded generally front perspective view of a cordwise cut locating fixture mounted to a blade assembly.
Figure 9:
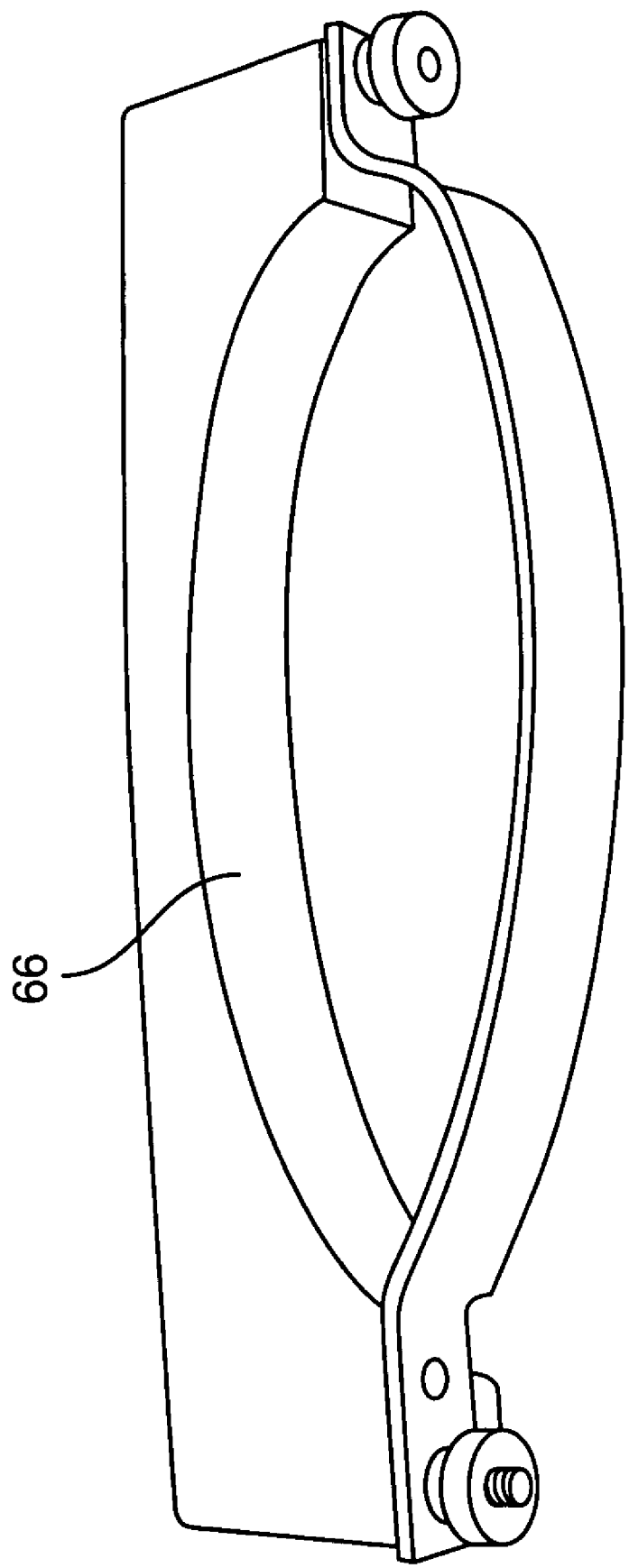
FIG. 9 is a perspective view of the cordwise cut locating fixture.

Referring to FIG. 8, a chordwise cut locating fixture 66 (FIG. 9) is mounted about the blade assembly 28a. The chordwise cut locating fixture 66 is a generally airfoil shaped fence. Preferably, the chordwise cut locating fixture 66 is located at a particular blade station. One skilled in the art will appreciate that the present invention has utility in any rotating system which requires pitch control.

Figure 10:
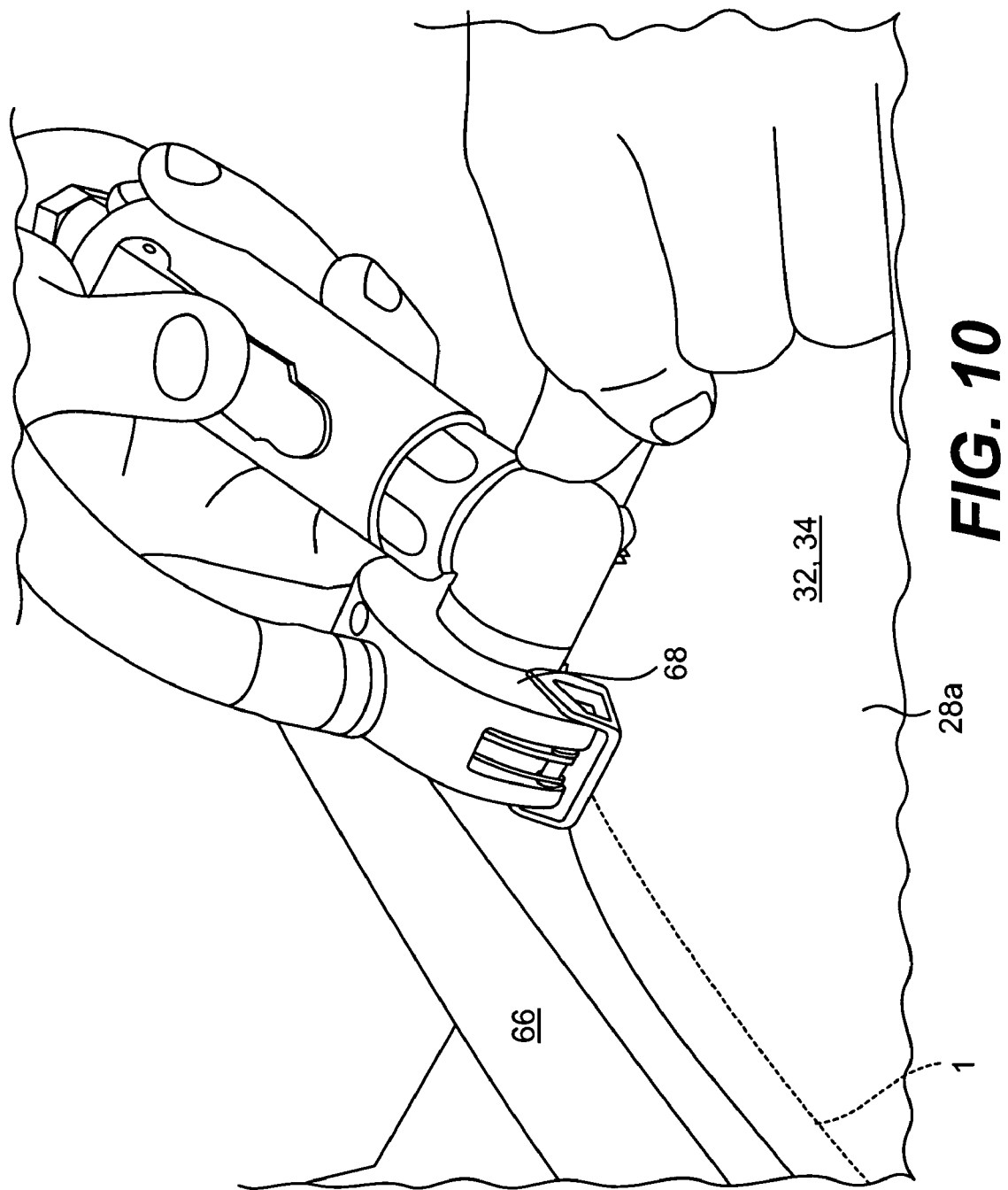
FIG. 10 is a top perspective view of a cutting tool adjacent the cordwise cut locating fixture of FIG. 9.
Figure 11:
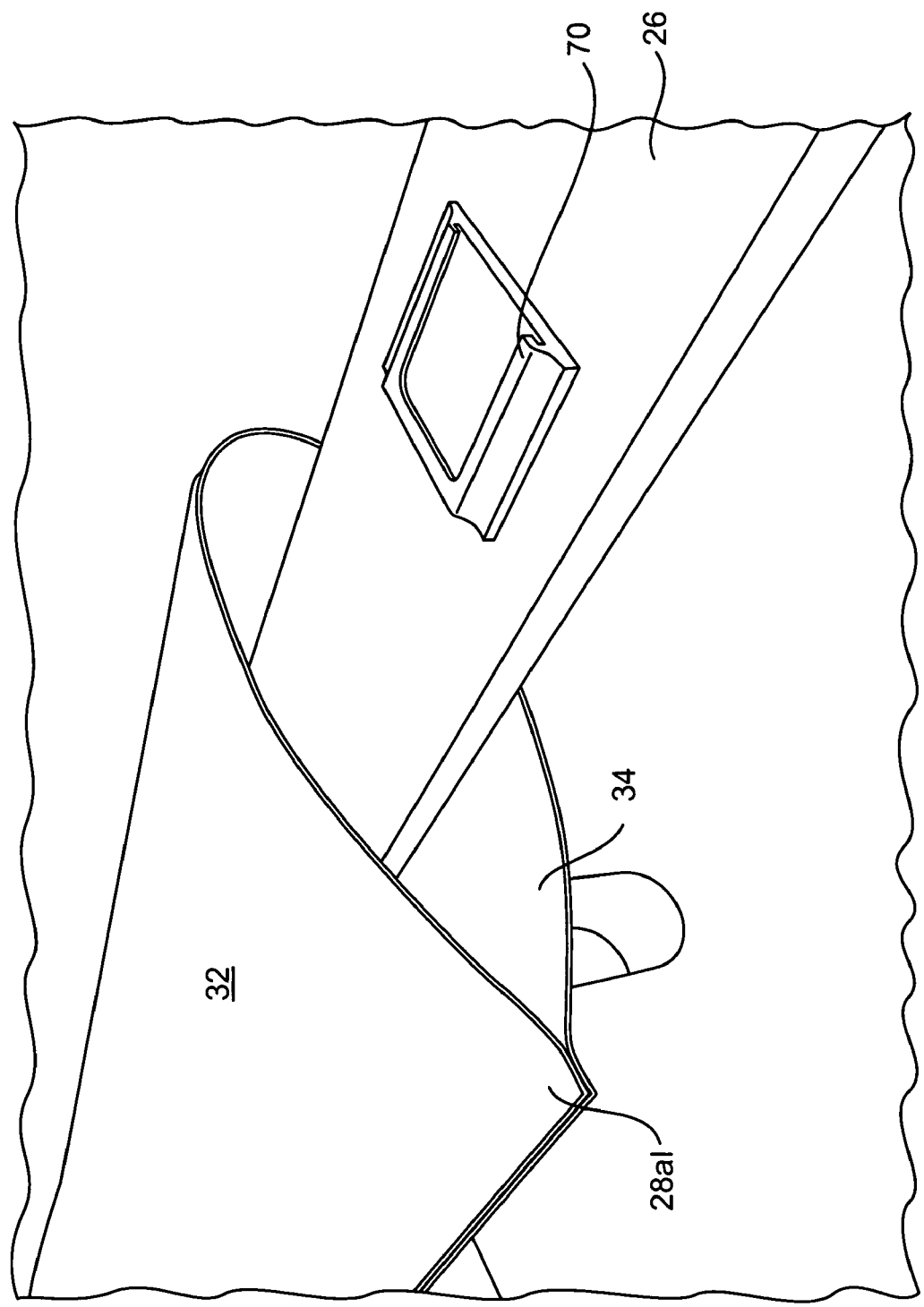
FIG. 11 is an expanded perspective of an inboard rotor blade segment illustrating the upper and lower blade surface skins cut back toward the rotor blade tip segment.

Once the chordwise cut locating fixture 66 is temporarily installed, a chordwise cut C is made through the upper and lower blade surface skin 32, 34 adjacent the cut locating fixture 66 with a cutting tool 68 or the like (FIG. 10). The chordwise cut C is preferably perpendicular to the spar 26. The pitch control horn 36a is then removed from the spar 26 by passing the spar through the slot S to remove the as-manufactured pitch control horn 36a (FIG. 11). An inboard rotor blade segment 28aI of the blade assembly 28 is then finished by removing doubler remnants and paint through sanding or the like.

Referring to FIG. 11, the inboard rotor blade segment 28aI has the upper and lower blade surface skin 32, 34 cut back toward a rotor blade tip segment 28aT (FIG. 2) of the rotor blade assembly 28 to expose an increased length of the spar 26. Generally, the inboard rotor blade segment 28aI is cut back to exposes a snubber bearing mounting plate 70.

Slotted Pitch Horn Installation

Figure 12:
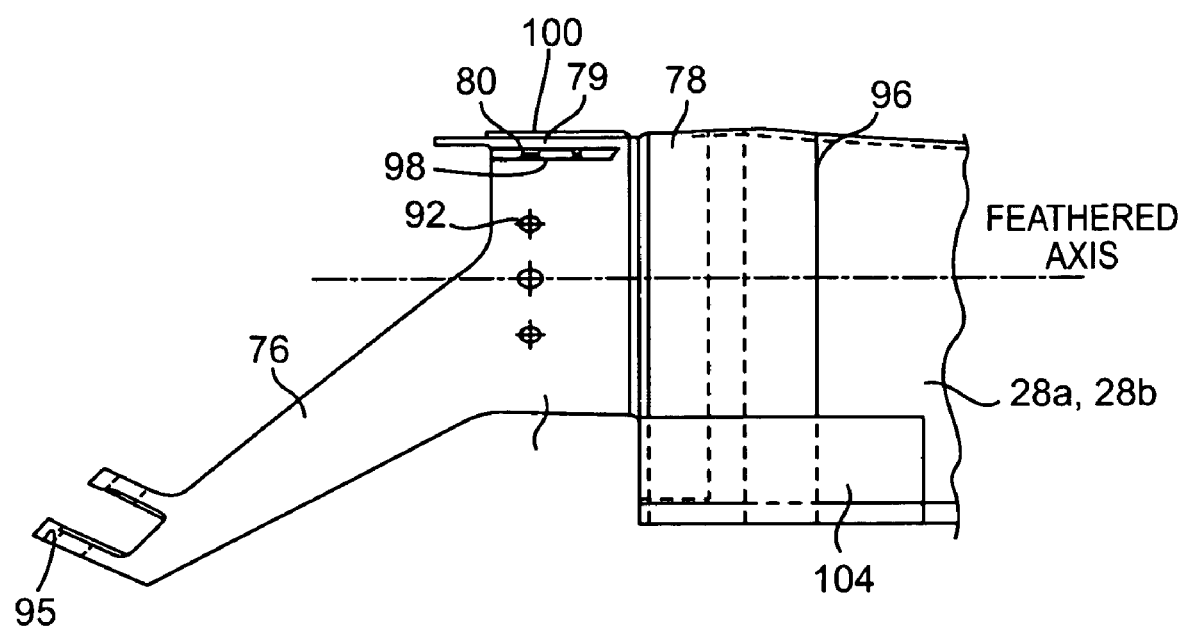
FIG. 12 is a top plan view of slotted pitch control horn, collar and trailing edge doubler mounted according to the present invention.
Figure 13:
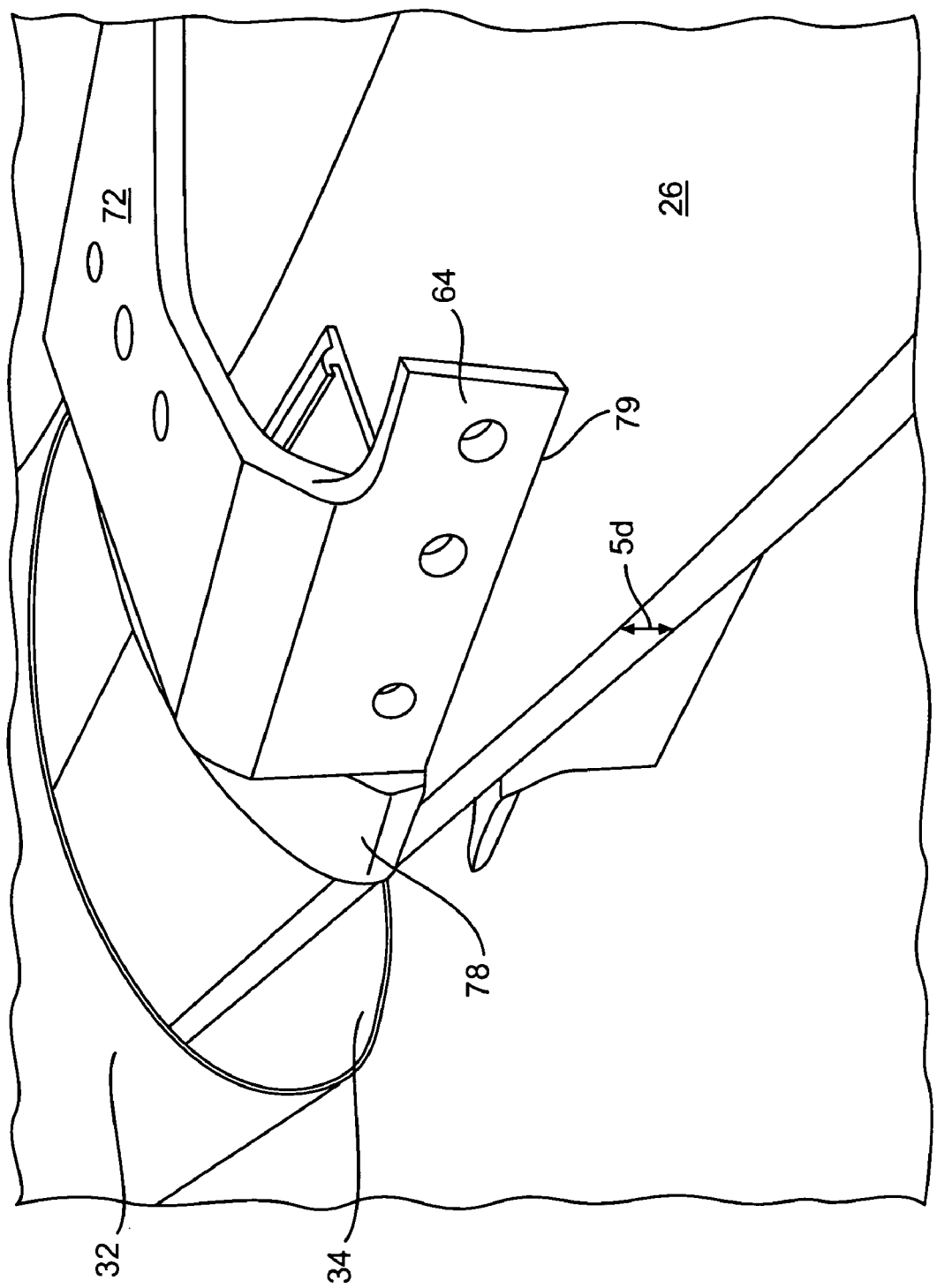
FIG. 13 is a generally front perspective of the slotted pitch control horn of FIG. 12 being mounted over a blade spar.

Referring to FIG. 12, a slotted pitch horn 72 includes a horn housing 74, a pitch control arm 76 and a horn fairing section 78. The slotted pitch horn 72 includes a horn slot 79 through the horn housing 74 longitudinally along a horn leading edge 80 which is generally parallel to the feathering axis. The horn slot 79 is sized to a width which permits passage of the spar 26 (also illustrated in FIG. 13). That is, the horn slot 79 is a width which approximates the depth Sd of the spar 26. The horn fairing section 78 is shaped to generally conform with the aerodynamic profile of the upper and lower blade surface skins 32, 34.

Figure 14:
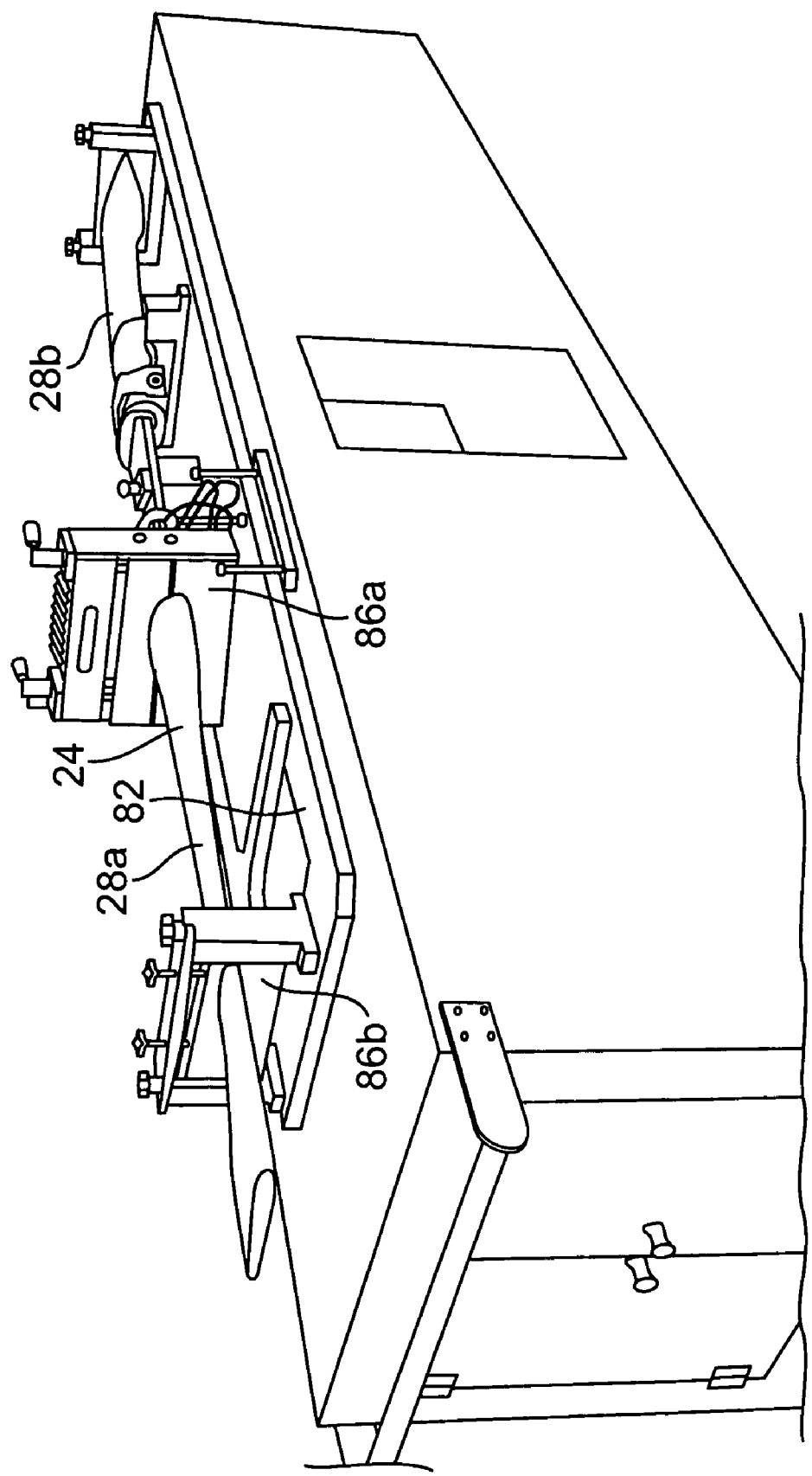
FIG. 14 is a perspective of a tail rotor assembly mounted in a blade bonding fixture.

Referring to FIG. 14, the tail rotor assembly 24 is mounted in a blade bonding fixture 82. The blade bonding fixture 82 preferably retains the tail rotor assembly 24 in a spanwise direction, a chordwise direction and a pitch direction to assure orientation of the pitch control horn 36a to the rotor blade assembly 28 during bonding.

Figure 15:
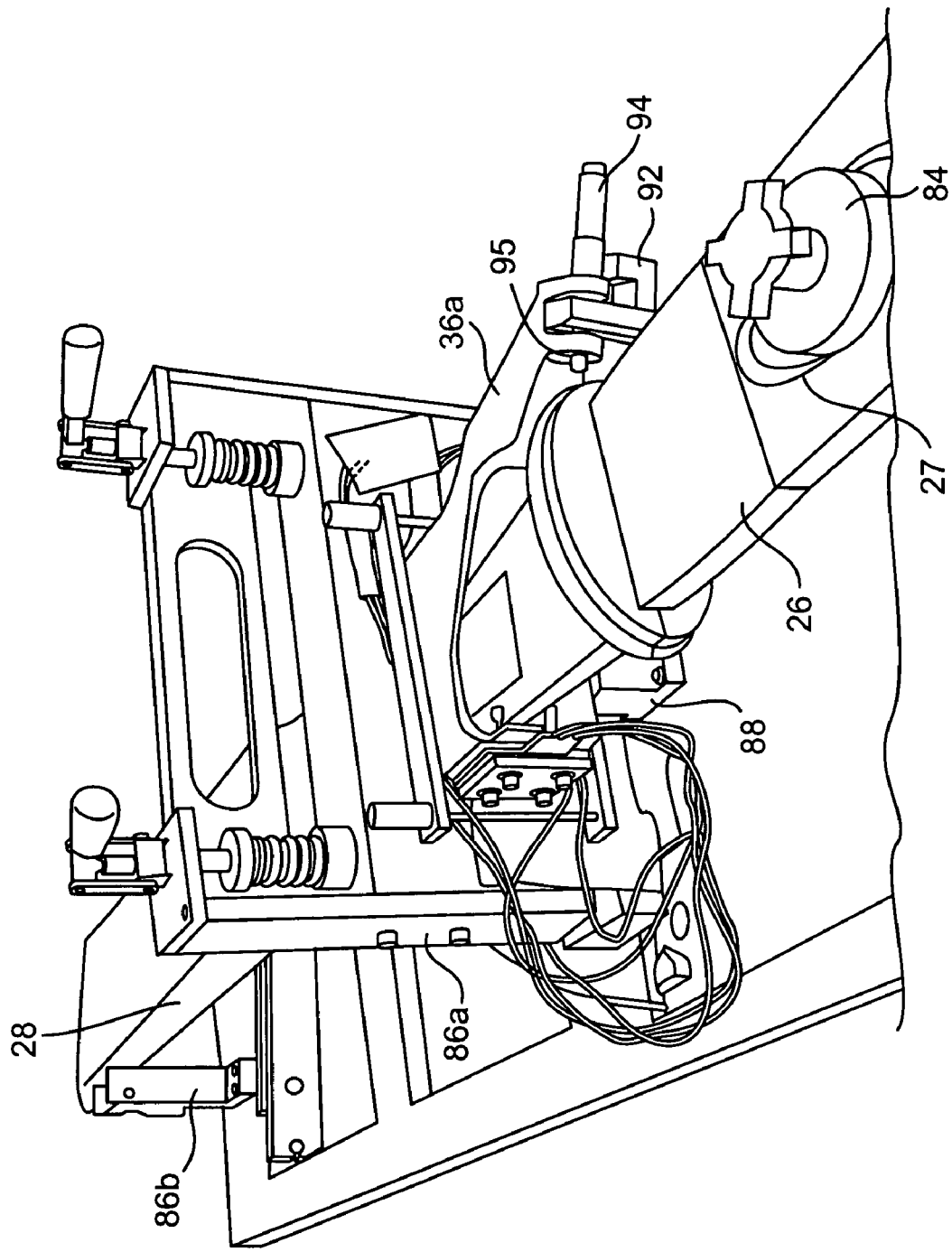
FIG. 15 is a generally top perspective view looking towards a rotor blade tip segment.
Figure 16:
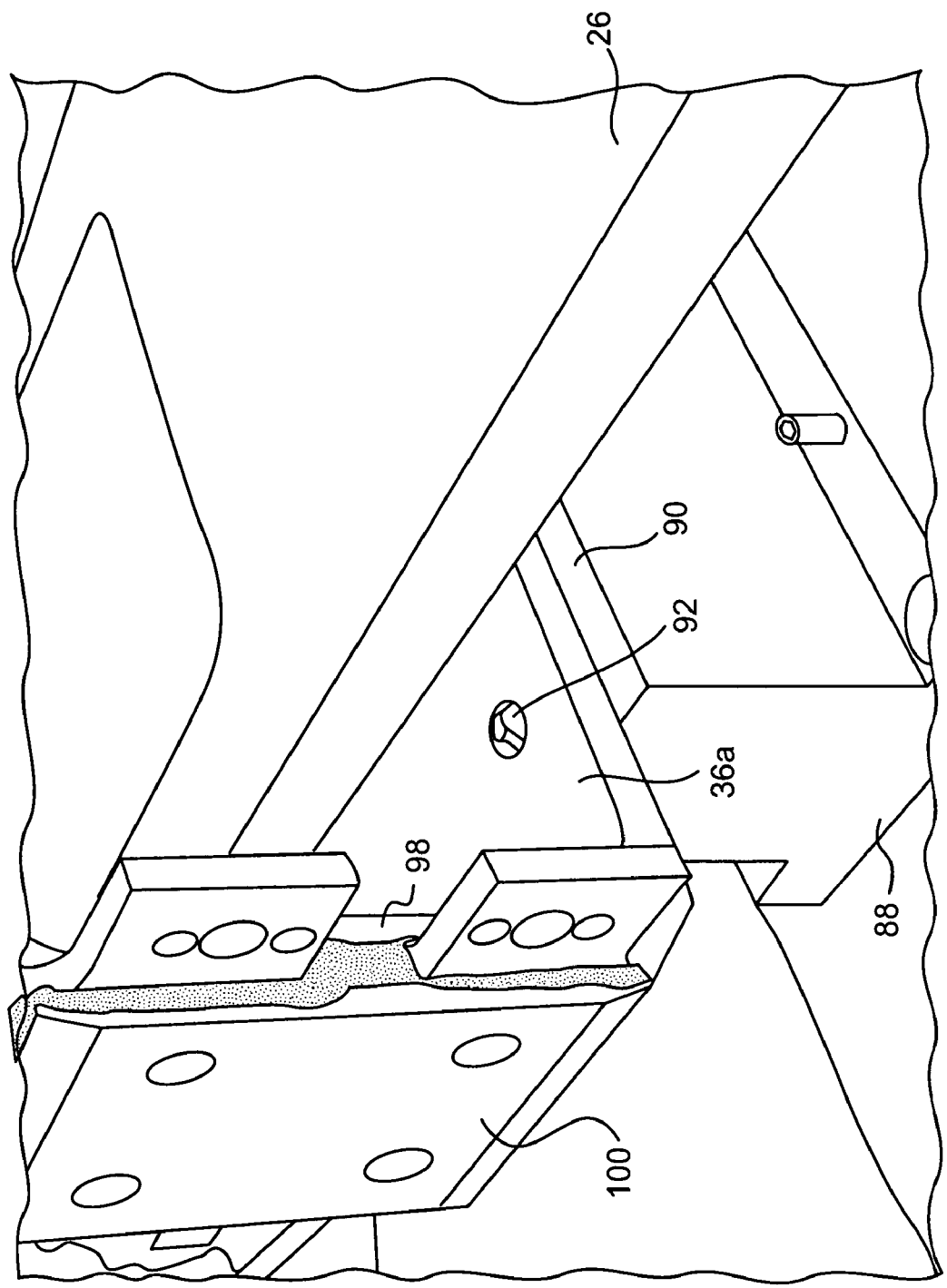
FIG. 16 is an expanded perspective view of a slotted pitch control horn mounted to an inboard clamp assembly and a top a locator block.

The blade bonding fixture 82 includes a central mount 84 (FIG. 15) which engages through the central mount aperture 27 in the spar 26 to spanwise locate the tail rotor assembly 24. The blade bonding fixture 82 supports an inboard clamp assembly 86a and an outboard clamp assembly 86b. The inboard clamp assembly 86a preferably includes a locator block 88 (FIG. 16) with a locating pin 90 which engages a pitch control horn aperture 92 (also illustrated in FIG. 12) to locate the tail rotor assembly 24 in the chordwise direction. The blade bonding fixture 82 further includes a pitch control arm mount 92 (FIG. 15) which includes a link pin 94 which engages a link aperture 95 in the pitch control arm 76 to locate the tail rotor assembly 24 in the pitch direction. It should be understood that other locating apertures and/or points may alternatively or additionally be utilized.

Figure 17:
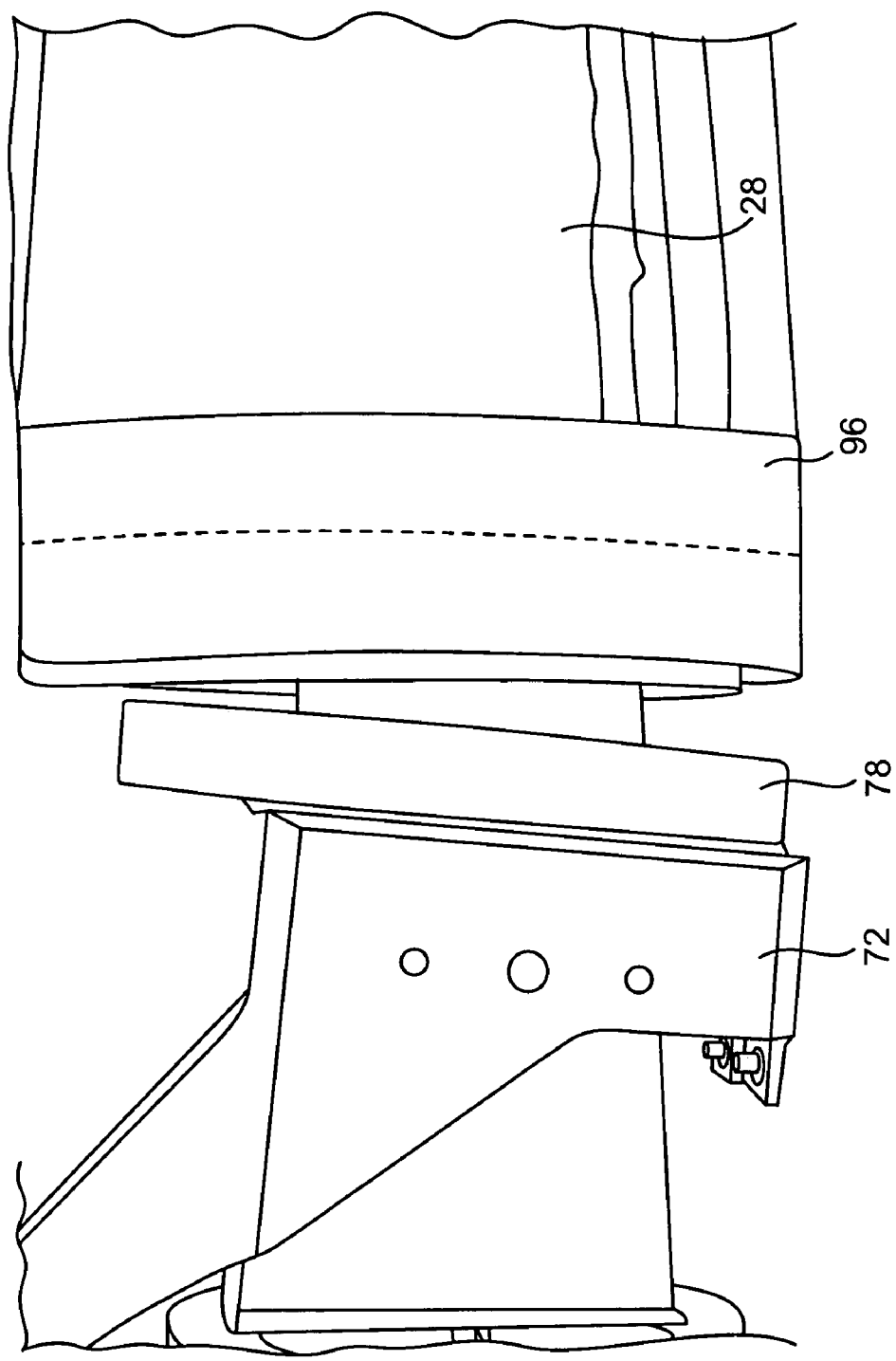
FIG. 17 is a top perspective view of a slotted pitch control horn and collar mounted over a spar prior to bonding to the rotor blade assembly.
Figure 18:
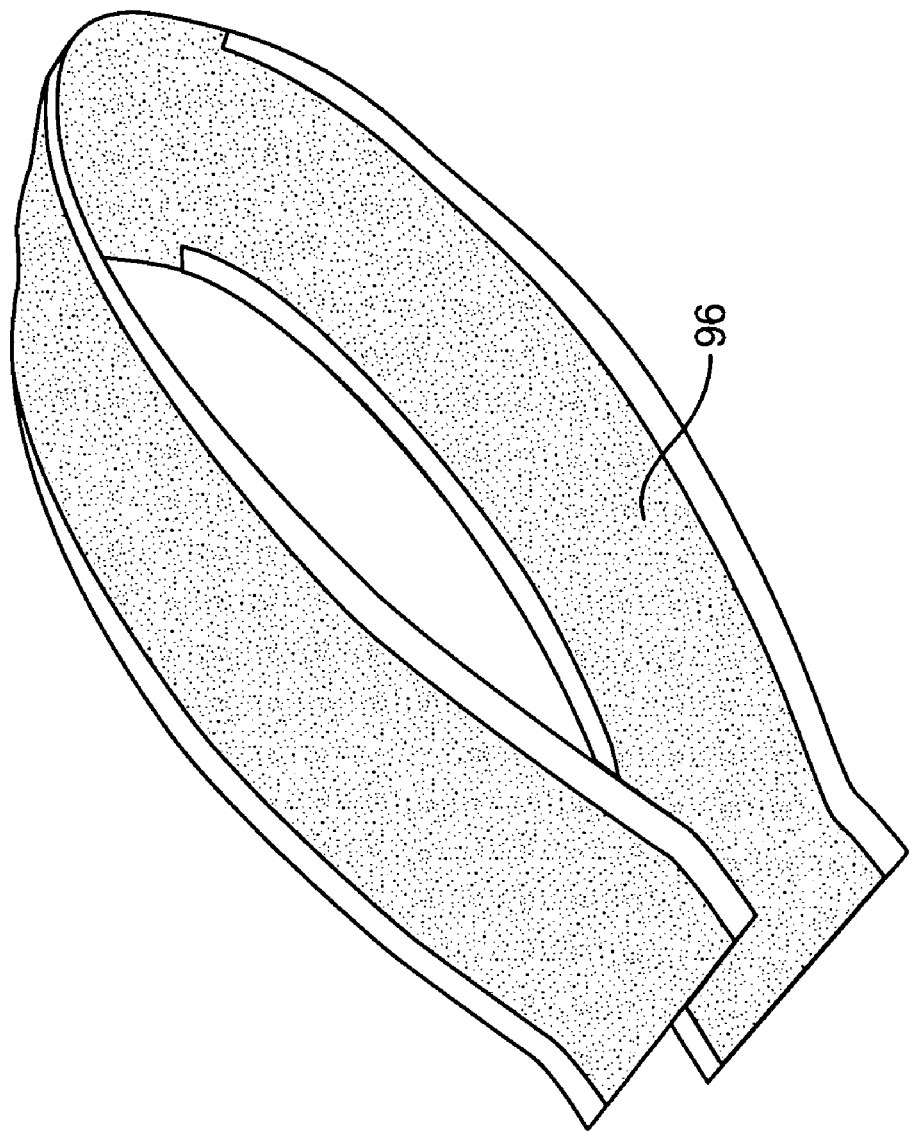
FIG. 18 is an expanded perspective view of a collar.
Figure 19:
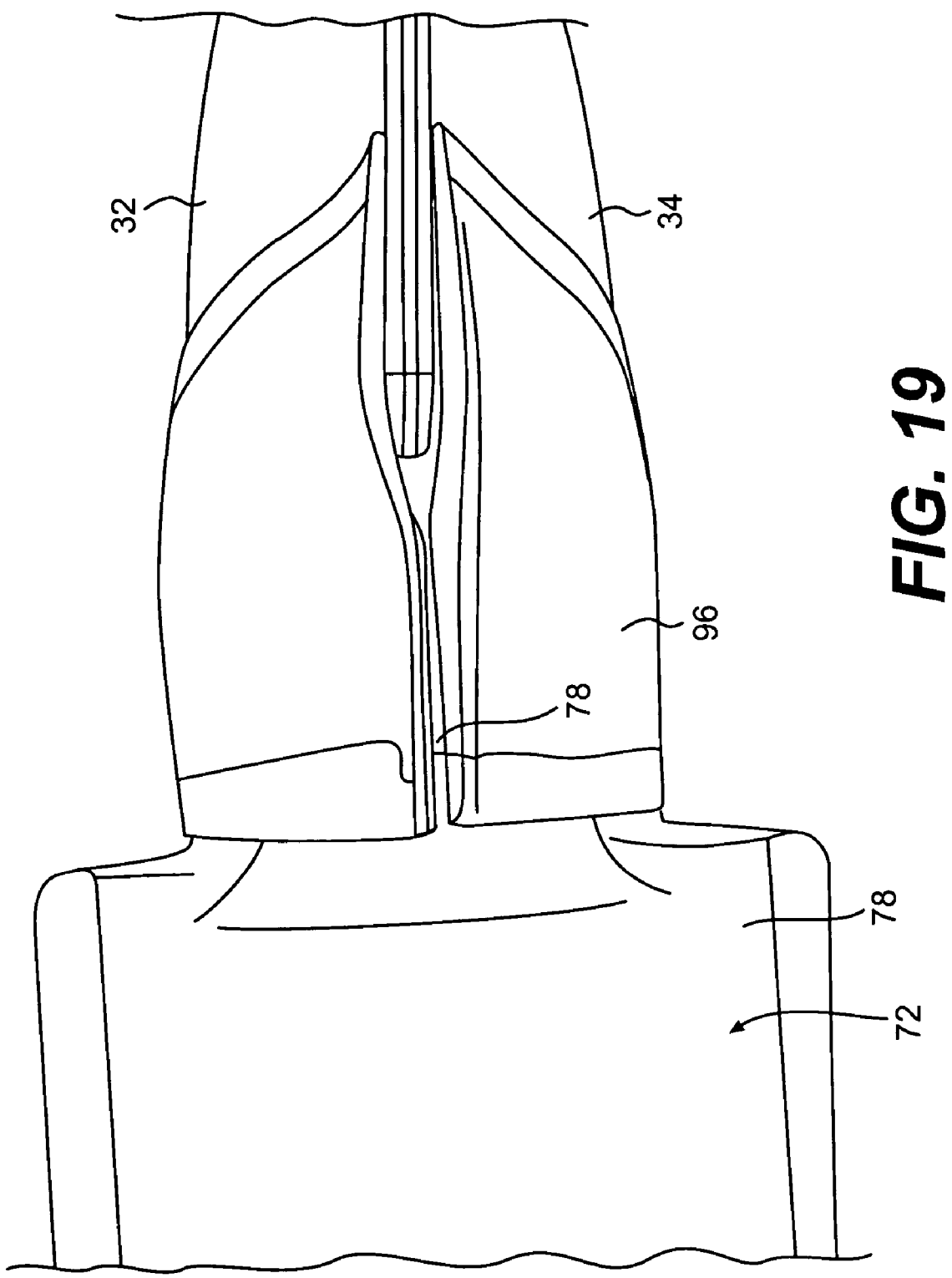
FIG. 19 is a rear perspective view showing a slotted pitch control horn and collar mounted to the blade assembly prior to bonding.
Figure 20:
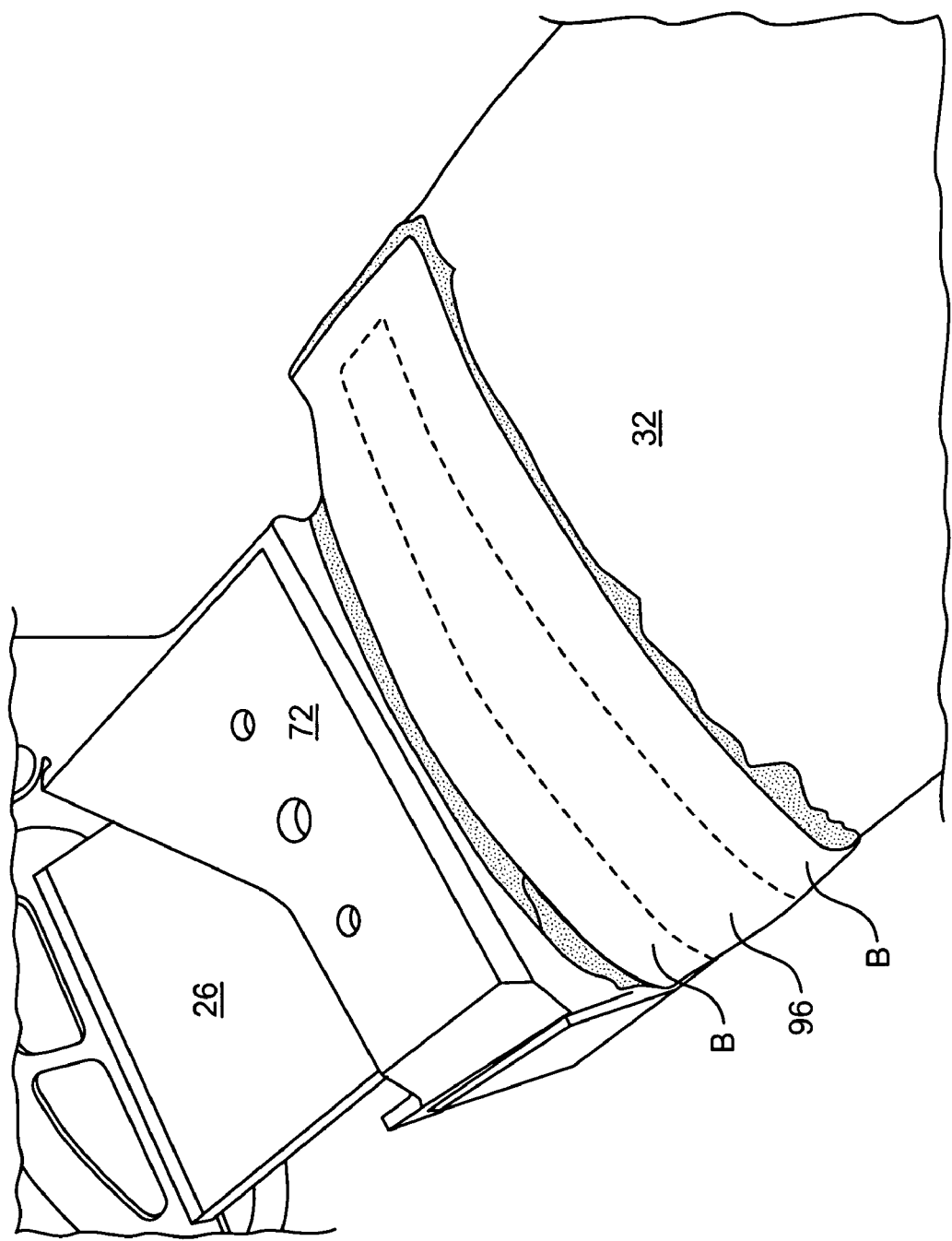
FIG. 20 is a generally top perspective view of a slotted pitch control horn and collar bonded to a rotor blade assembly.

Referring to FIG. 17, the slotted pitch horn 72 is assembled over the spar 26 through the horn slot 79. A collar 96 (FIG. 18) spans a portion of the horn fairing section 78 and a portion of the upper and lower blade surface skins 32, 34 (also illustrated in FIGS. 12 and 19). The collar 96 is bonded to the slotted pitch horn 72 and the upper and lower blade surface skins 32, 34 at predetermined bond areas B (FIG. 20).

Figure 21:
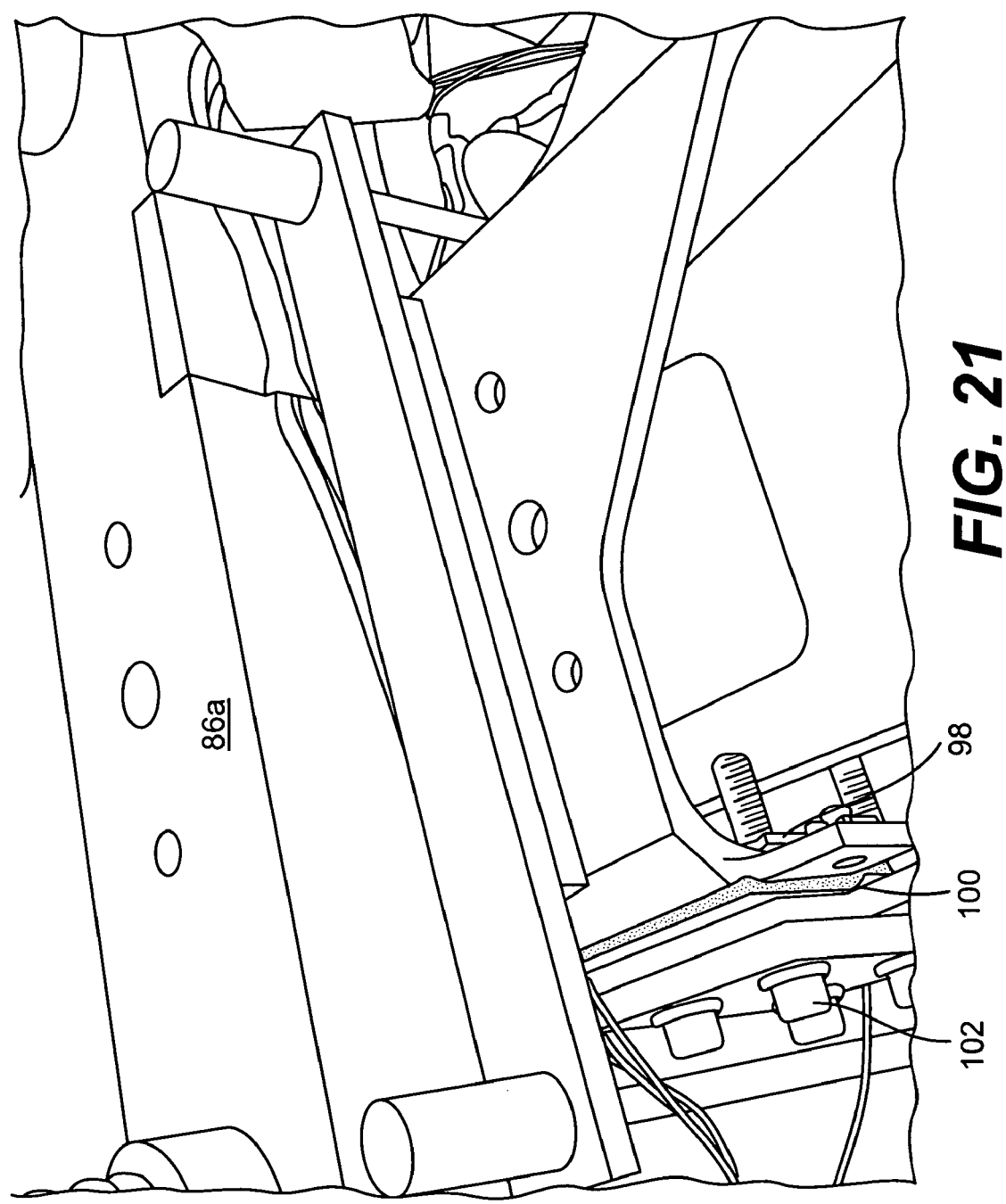
FIG. 21 is a top perspective view of a pitch control horn mounted within the inboard clamp assembly during bonding.
Figure 22:
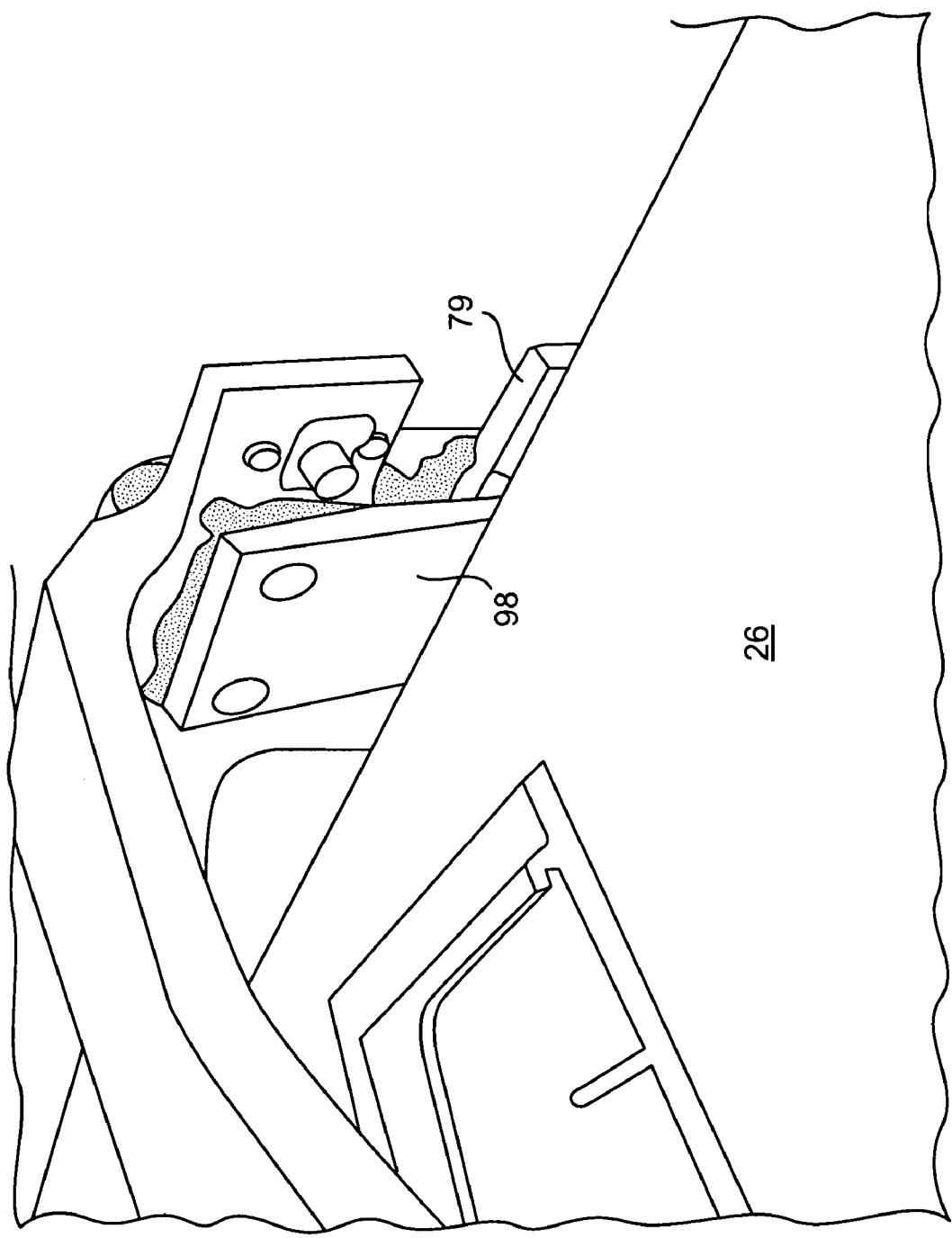
FIG. 22 is an exploded side view illustrating an inner horn plate bonded to the pitch control horn.
Figure 23:
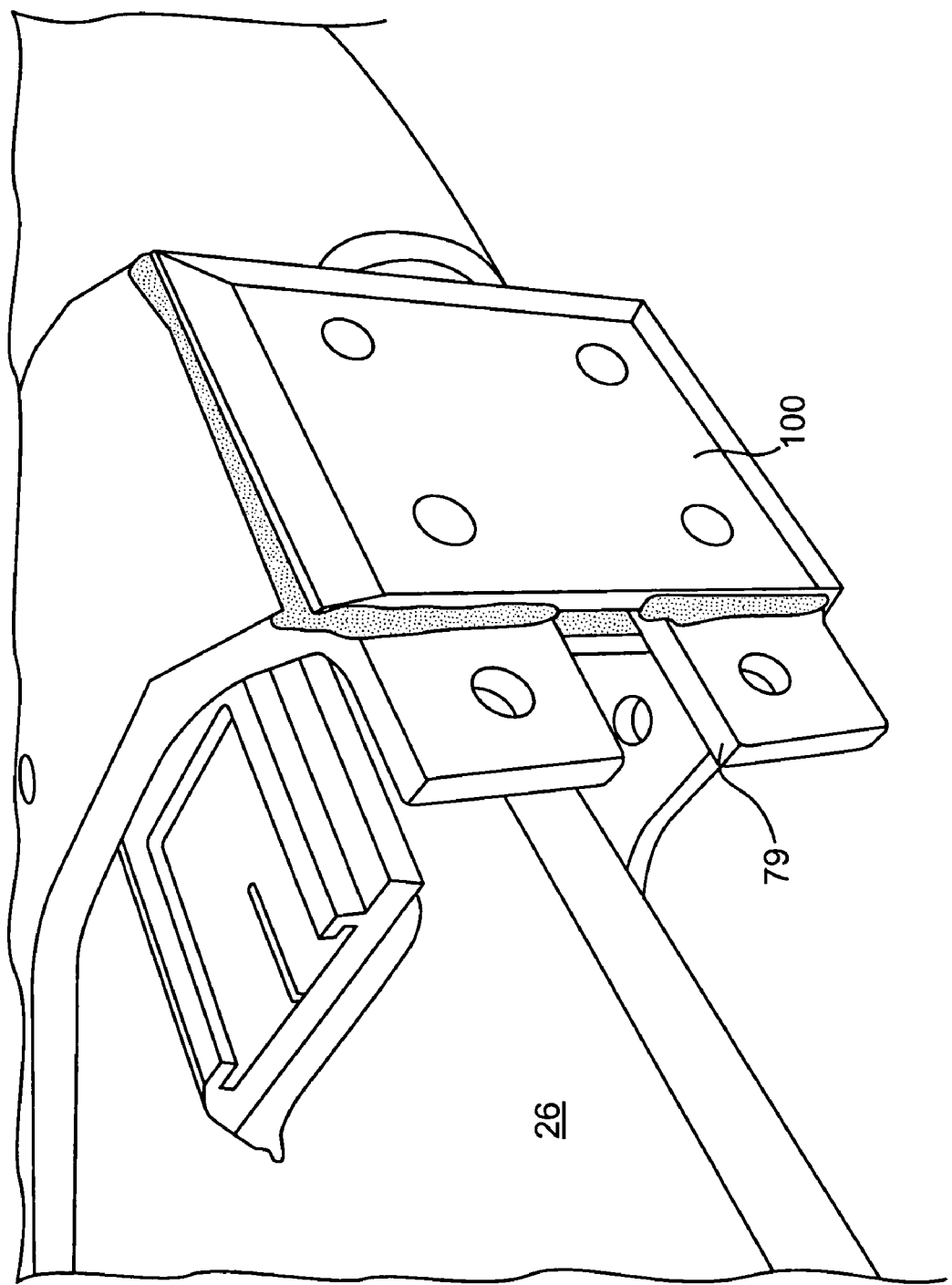
FIG. 23 is a front leading edge view of a outer horn plate bonded over the slot of the pitch control horn.

Referring to FIG. 21, an inner horn plate 98 (FIGS. 22 and 12) and an outer horn plate 100 (FIGS. 23 and 12) are bonded over the horn slot 79. Preferably, one layer of SS8612-007 (8 wt) adhesive is utilized. Fasteners 102 such as ¼-20 bolts may be temporarily passed through the plates 98, 100 to further assure curing and alignment.

Thermal energy from the central mount 86a is applied to the bond areas B (FIG. 20) to cure the adhesive. After the adhesive cures, the tail rotor assembly 24 is removed from the blade bonding fixture 82. It should be understood that various attachment and bonding procedures may alternatively or additionally be utilized with the present invention.

Referring to FIG. 24, a trailing edge doubler 104 (also illustrated in FIG. 12) is bonded to the blade trailing edge to finish the trailing edge horn area and close the upper and lower skin surfaces 32, 34 at the blade trailing edge Inspection Excessive adhesive is cleaned by sanding or the like. The bonds are inspected to assure acceptance through visual and coin tap methods as generally understood. Preferably, Visually Inspect: Collar-to-Horn, Collar-to-Torque Tube and Inner/Outer plate bonds for proper squeeze-out. Inspect both pylon and outboard airfoils, both inside and outside surfaces; and Coin tap Inspect: Collar-to-Horn, Collar-to-Torque Tube, Inside Plate-to-horn and outside plate to horn. Specific inspection and bond control criteria will be understood by one or ordinary skill with the benefit of the present invention.

Tail Rotor Blade Component Assembly

The original and/or new non-bonded components are then reassembled to the tail rotor assembly 24. The non-bonded components (FIGS. 2 and 3), e.g., the tip cap assembly 40, the counterweight assembly 42, the leading edge heater mat assembly 44, the de-ice harness plug assembly 46, the chordwise balance weight 48, the balance bracket, 50, the boot 52, the fairing 54 and the snubber bearing 56 for each blade assembly 28a, 28b are preferably replaced or reinstalled to finalize the tail rotor blade assembly 24.

Identification

Each tail rotor assembly is preferably identified to provide for later tracking and inspection, however, Applicant has determined that the tail rotor replacement method provides fatigue strength demonstrated to be equivalent to the production non-replaceable tail rotor horn.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of replacing a pitch control horn on a tail rotor assembly comprising the steps of:
    (1) removing a pitch control horn from a tail rotor assembly;
    (2) sliding a slotted pitch control horn over a spar of the tail rotor assembly; and
    (3) bonding the slotted pitch control horn to the tail rotor assembly.

2. A method as recited in claim 1, wherein said step (3) further comprises the step of:
    bonding a fairing section of the slotted pitch control horn to an upper blade surface skin and a lower blade surface skin.

3. A method as recited in claim 2, wherein said step (3) further comprises the step of:
    bonding a coupler over a portion of the slotted pitch control horn and a portion of the upper blade surface skin and the lower blade surface skin.

4. A method as recited in claim 1, wherein said step (1) further comprises the steps of:
    milling a slot along a leading edge of the pitch control horn; and
    cutting chordwise through an upper blade surface skin and a lower blade surface skin adjacent the pitch control horn.

5. A method as recited in claim 1, wherein said step (2) further comprises the step of:
    sliding the slotted pitch control horn over the spar through a longitudinal slot in the slotted pitch control horn.

6. A method as recited in claim 1, wherein said step (2) further comprises the step of:
    sliding the slotted pitch control horn over the spar through a leading edge slot in the slotted pitch control horn.

7. A method as recited in claim 1, wherein said step (3) further comprises:
    bonding a trailing edge doubler to a portion of the slotted pitch control horn and a trailing edge of the upper blade surface skin and the lower blade surface skin.

8. A method as recited in claim 1, wherein said step (3) further comprises the step of:
    bonding a horn plate over the horn slot.

9. A method of replacing a pitch control horn on a tail rotor assembly comprising the steps of:
   (1) removing a pitch control horn from a tail rotor assembly;
   (2) sliding a slotted pitch control horn over a spar of the tail rotor assembly generally transverse to a pitch axis of the tail rotor assembly; and
   (3) bonding the slotted pitch control horn to the tail rotor assembly.

10. The method as recited in claim 9, wherein said step (1) further comprises:
   (a) cutting the pitch control horn from the tail rotor assembly.

11. The method as recited in claim 9, wherein said step (1) further comprises:
   (a) destroying the pitch control horn during said step (1), the pitch control horn of original manufacture with the tail rotor assembly.

12. The method as recited in claim 1, wherein said step (2) includes replacing the pitch control horn with the slotted pitch control horn, the slotted pitch control horn of a design different than the pitch control horn.

13. The method as recited in claim 1, wherein said step (1) further comprises: (a) destroying the pitch control horn during said step (1), the pitch control horn of original manufacture with the tail rotor assembly.

* * * * *

UNITED STATES PATENT AND TRADEMARK OFFICE
CERTIFICATE OF CORRECTION

PATENT NO. : 7,216,429 B2 Page 1 of 1
APPLICATION NO. : 10/937007
DATED : May 15, 2007
INVENTOR(S) : Logan et al.

It is certified that error appears in the above-identified patent and that said Letters Patent is hereby corrected as shown below:

Claim 12, Column 8, line 6: "claim 1" should be --claim 9--

Claim 13, Column 8, line 10: "claim 1" should be --claim 9--

Signed and Sealed this

Fourteenth Day of August, 2007

JON W. DUDAS
*Director of the United States Patent and Trademark Office*